(12) United States Patent
Hobbs

(10) Patent No.: X6707
(45) Date of Patent: Aug. 18, 1831

(54) SHINGLES, &C., SAWING

(76) Inventor: Jonathan Jr. Hobbs

Jonathan Hobbs. Jr. of Falmouth
Letters Patent
The Schedule referred to in these Letters Patent and making
part of the same, containing a description of his improvement
in the words of the said Jonathan Hobbs Jr. himself of his im-
provement in the manner of making and constructing machines
for sawing Shingles. Clapboards &c.

To all to whom these presents shall come, be it known that
I Jonathan Hobbs Jr. of Falmouth. Yeoman. Have invented
a new and useful improvement in the mode and manner of ma-
king and constructing a machine called, the Clapboard, Shingle
& Dimension Machine, and that the following is a full and exact
description of the construction and operation of the said Machine
as invented and improved by me. to wit, 1. On the Sills or Sleepers of any mill, I place the
Machine in manner following: The travelling carriage on which, and
by which, the work is performed, is placed on four friction rollers, eight-
een inches in diameter more or less, and made of wood or metal. These
may be in pairs on one shaft, or single as may be most convenient. 2, on
the Sleepers or sills of the mill, I build the frame which I call the
bed work or frame. in which I hang the saws. This frame is built
of plank sixteen inches high four feet long, and two and a half
feet wide more or less, of a proper thickness say four inches. This frame
stands crosswise to the machine. About midway of this frame, I frame
another plank across it to hang the left gudgeon of the saw shaft. the other
gudgeon rests on the right hand end of this frame. The shaft of this
saw may be two feet more or less ~ 3. On this frame I hang the per-
pendicular, circular saw of any proper diameter, which plays near the inner
ends of the toe-bars described in N.o 15. This saw cuts the shingles, clap-
boards, and dimension stuff &c. On the right hand end of the saw
frame N.o 2, I set four posts, which are not connected with it. They
may be two and a half feet high, more or less. On these posts I put a plate twelve feet long more or less. These may be called the
side frame — 5. On this plate are two movable inclined planes,
having their slopes towards the tail end of the machine, which are
set and held in their proper places by a screw each, and may be
set any where on the plate, where needed. These planes may be
of different thickness according to the thickness of the stuff to be
sawed. The plane towards the head end of the machine, should
be about the breadth of the plate. The other about half the breadth
of the plate. So that the truck on the head set may pass by it in
its travel fore and aft in sawing shingles as is more fully described
in No 17. In sawing shingles the two inclined planes are used. In
sawing clapboards and other stuffs, but one is used. 6. On the
inside of the posts described in No 4 I place a slide, nine feet
long more or less. The end towards the head end of the machine
is framed into the second post, with a loose sliding tenon reaching
through the post, and more about half its length. This slide passes
free, but snug by the other two posts resting on the side of the saw
frame toward the tail of the machine. That part of this slide
which makes the tenon aforesaid is fastened onto the outer side
of the slide piece and the square end of it hits against the third
posts, when it has moved far enough to mash on the gear described
in No 8. — 9. This slide should be level with the carriage frame —
7. In this slide near its end towards the head end of the machine
an iron pin is put in a proper place, to be operated upon by a
pin in the right hand head block and tail block. The pin in
the head block when the saw is near the last of its run in sawing
any piece takes hold of the pin in the slide and moves the slide
as the carriage runs and when the saw is out mashes on certain
gear described in No 8.9. whereby the carriage is hauled back
ready for the next run of the saw. A pin in the tail block at
the proper place at the last of the run of the carriage when haul-
-ing back takes hold of the same pin in the slide, and unmashes
the said gear, and then the weight hauls the carriage forward to the cut of the saw, and so alternately as one shingle after another is
sawed. – 8. A double iron brace or vee, is fastened on to the under
side of this slide near the end, towards the tail of the machine, which
stands out on the inside of the machine four inches, more or less. –
9. In the point or centre of this vee, the long end of an iron
knee say 12 inches long is fastened by having its end drawn to
a pin and turned down through a hole in the vee. The other
end of this knee is about seven inches, having the end turned
down, and a notch cut in it, which notch drops on to the rim of
the hollow shaft No. 10. – 10. A hollow shaft or cylinder is slip-
-ped onto the inner end of the shaft of a wheel described in No.
12. The barrel of this cylinder is about _ inch and a half, and the
bore about nine eighths of an inch diameter, and plays loose on
the shaft of the wheel; On the end of this cylinder next to the
wheel, a rim rises five inches in diameter more or less. The short
end of the knee No. 9. mashes on to the rim on the top and at the
centre as described in No. 9, On the outer side of this rim and
next to the hub of the wheel, is a flat iron pin and a correspond-
-ing one in the hub of the wheel. When the slide is moved by
the forward motion of the carriage at the last of the run of
the saw, and when run out the motion of the slide, vee, and
knee aforesaid, slips the cylinder aforesaid on the shaft of the wheel
towards the hub of the wheel, whereby the pin in the rim of the
cylinder and the pin in the hub of the wheel are locked together
and then the wheel turns with the cylinder winds a line around
it. – 11. A line, one end of which is fastened to this cylinder &
the other end to the cross bar in the head end of the carriage
frame, passes round a pulley which stands in front of the
head friction rollers. When the gears No 8.9.10 are mashed
on, this line winds round the cylinder, hauls round the pulley,
and runs the carriage back as described in No. 10, and brings the
bolt back ready for sawing the next shingle, see also No 7. – 12.
At the tail end of the machine on the right side, the wheel on whose Shaft the cylinder No 10 works, is placed. This wheel may be five feet in diameter more or less, and may be driven by a band or any other power. It is made and hung as wheels commonly are. In the rim of this wheel any number of Spoke sheaves, which may be necessary may be placed, having the edges come out on the inside of the rim by which the shingles may be jointed ~ 13. The carriage is built as follows. two side pieces about sixteen feet long, and four inches by six. These side pieces are framed together by two cross bars of proper size near each end. A grooving is made in the under side of each side piece, in which the trucks run, they being shaped on their edges to that grooving. No 1. this frame may be four feet wide more or less ~ 14. On this carriage frame about four feet from the head end, I place a block eight inches high, four thick, and sixteen long more or less, on each side piece of this frame, and bolt them on stationary in their proper places These should be exactly opposite. Towards the tail end of the carriage I place another block on each side piece like the others. These also are bolted on, but are movable to accommodate different lengths of stuff to be sawed. On each of these sets of block I bolt a timber seven inches by four, reaching across the ends flush with the outside of each block. On the inside of each of these timbers I bolt a piece of like length, seven inches by three, with three or more bolts. These inside pieces and the timbers to which they are bolted form clamps which hold other parts of the machinery. These pieces altogether form what I call the head stock or block and the tail stock or block ~ 15. Between each of these clamps No 14, I place an iron stirrup made as follows. I take a bar of iron about nine eights square, and bend it up in form of a staple about one foot broad and twenty five inches long. Then I turn about seven inches of each end side-wise to a right angle. These ends so bent, I call the toes of the stirrup. On the upper side of these toes, I rivet a bar of iron inch and a quarter square. This I call the toe bar. At the [illegible]

or right angle of these toes I frame across another bar one and a quarter inch by half inch, and rivet it in, parallel with the toe bar. These form what I call the foot of the stirrup. Then I cut a notch in the toe bar and heel bar, to place the pivots of an iron roller, which is used in sawing clapboards. These stirrups are placed between the clamps No 4 which are set together by the bolts so as to hold them in their proper place firmly, and may be raised or lowered to suit conveniences. 16. The setters are placed on the inside of these stirrups and are attached one to the left hand corner of each stirrup, and made in the following manner. I take a bar of iron two inches and a half by half inch, from the pin aforesaid I turn down the left hand end perpendicular about eighteen inches more or less according to the height of the head and tail blocks. The other of the bar about four feet more or less according to the breadth of the machine lies horizontal, and reaches across the machine on to the plate No 4. The setter towards the head end of the machine, is a little shorter than the other so that it may pass by the other inclined plane on which the other setter rises when setting the shingle bolt No 5. as the carriage travels fore and aft. The right hand ends of these setters are turned up perpendicular about two inches with a quarter twist so as to bring the flat side of the bar out; leaving two bolt holes through each. A slide standing perpendicular, is attached to the right hand end of each setter by two bolts. The lower end of each slide is drawn round and turned out horizontally to the right and makes a pivot on which a truck or friction roller runs, and is held on by a pin. These trucks are two inches diameter and inch thick more or less and made of wood or metal. The perpendicular parts of the setters come down loose through the clamps and within and near the left hand end of the head and tail blocks and near to them. The horizontal parts of these setters should lay about one foot above the clamps holding the stirrups more or less. The slides aforesaid should each have a long slot or mortice so that they may toe slipped up or down on the ends of the setter whenever the
setters are raised or lowered. – 17. When the carriage is hauled
back by the line, which winds round the cylinder No 10 the [illegible]
which bear the right hand end of the setters at the proper time
and place, to wit, when the bolt has travelled by the perpendic-
-ular mount the inclined plane No 5. and lift the setters. and
thereby move the machinery, whereby the bolt, is set for the next
shingle to be sawed. 18. A horizontal iron rail is fastened on to
the slides No 16, by the same bolts which fasten the slides onto the
setters. This rail should have two long slots or mortices in one end
so that the setters may be brought together or widened as occasion
may require to accommodate different lengths to be sawed. The use
of this rail is to keep the setters, steady and parallel when travelling.
19. A brace reaches from the head slide on to the tail stock. It
is slipped into the axle of the head truck, and is fastened onto the
tail stock, by a bolt. This end of the brace has several holes so that
it can be lengthened or shortened to accommodate different lengths of
bolts to be sawed. The use of this brace is to keep the setters steady with
the travelling motion of the carriage when at work. This brace may
be three feet long more or less. – 20 The bolt to be sawed rests on
the two toe bars described in No 15, and is held in its place by the
jaws described in No 24 – 21. On the inner side of the perpendic-
-ular part of each setter described in No 16 an iron hand is attached
by a round bolt and screwed on by a nut. These hands passing thro'
a spring described in No 22 reach to the centre of a rag wheel de-
-scribed in No 25 in each jaw; and they turn those wheels when
the setting motion is given to the setters. These hands are each
about fourteen inches more or less in length. – 22. These hands near
the rag wheel, pass loose through spring rests, which keep them in
their proper places to operate. These springs are each at one end
screwed on to the inside of each jaw near the lower edge. 23. Directly
behind or under the perpendicular ends of the setters, a flat piece of
iron is fastened on to the head and tail blocks, with a pin hole in the outer end), which project on the inside of each block two inches
more or less, and may be two inches broad more or less. The outer ends
of the Jaws are fastened or jointed on here by a round iron bolt. 24.
These jaws are made in the following manner: The body parts are made
of wood twelve inches long and three by two, more or less for lightness
and convenience sake. The ends toward the head and tail blocks
are scarfed down thin. On the under side an iron strap of proper
dimension is fastened. In the outer ends of these straps is a round
hole in each, whereby the jaws are fastened on to the iron pieces
described in No 23 by a round bolt and a nut which make the
joints on which the jaws swing, when they open and shut. On
the upper and under sides of the other ends of these wooden jaw
pieces a corresponding iron strap is bolted eight inches long &
two inches by quarter of an inch more or less. The ends of these
straps should stand out beyond the wood about three inches
more or less. Each of these straps has a round hole in the outer
end for the gudgeon of an upright shaft. Therefore I have one
shaft to each jaw, and the length of these shafts corresponds with
the width of the wooden part of the jaws. A rag wheel is cast sol-
-id on to the lower end of each shaft and may be about two in-
-ches in diameter more or less. These rag wheels are divided into
twelve parts, or notches, and they are alternately one twice the
length of the other, making six pair on the whole circumference
of the wheel; and the pairs must be all of a length, and the
long notches all of a length, and the short notches all of a
length, and so the long and the short notches come one after
the other all round the wheel. The hands described in No
21 should be so placed upon these rag wheels, that when one
sets a long notch which makes the butt of a shingle, the other
sets a short notch, which makes the point of a shingle, and so
on alternately until the bolt is all sawed up. About one inch
above the rag wheel, an iron spur wheel one and a half inch in
diameter, is put into each shaft with a square hole. These spur wheels may be fastened on, or put on loose at pleasure and their di-
=ameters may be varied at pleasure, so as to set thicker or thinner if desi
=red. These spur-wheels bear hard against the ends of the bolt, and as
the hands turn the rag wheels, the spur wheels carry forward and
set the bolt for the next shingle to be sawed. A Screw passes thro'
the under iron strap on each jaw, which bears hard against the
underside of each rag wheel which makes the wheels turn hard
enough to stand firm in their places where the hands set them.
The inner ends of these jaws rest on the right hand toe bar of each
Stirrup. In the back side of each jaw and near the spur wheel is
an iron hook into which the two inclined braces are hooked as described in
No. 25. All these parts make the jaws. - 25. Between the head &
tail blocks a flat piece of iron, three feet long, one inch by quarter
inch more or less, having its outer end full of holes, about half inch
in diameter, passes loose through a mortice in the left side piece of the
carriage. On the upper side of the inner end of this piece, is an
iron pin of proper size and length. This I call the centre piece.
A piece of iron of similar size having its inner end full of holes, is
hitched on to the pin on the inner end of the centre piece afore-
said and passing under the toe bar and heel bar of each Stirrup
turns up behind and over each heel bar, and by a hole is slipped
on to the hook on the backside of each jaw. These two pieces are
called the inclined pushing and hauling braces. These operate in the
following manner. When the centre piece is hauled out, these braces
haul the jaws together and set the spur wheels hard against each end
of the bolt and hold it firm in its place. When this centre piece is
hauled out taught it is held in its place by a pin passed through one
of the holes and is set behind a strong spring, which holds all firm
in their places. When this centre piece is pushed in, the braces open
the jaws and let the bolt loose. - 26. The spring which holds the
centre piece No. 25. is fastened on to the left side of the carriage
frame, and may be of steel or wood, as may be most convenient & should
be of proper strength and length. - 27. A piece of wood 15 inches long & the bolt may not come too hard against the saw at the first of its cut
On the side of the roller and against the ending of the diminution of the
spiral grooving. I bore a dozen holes, more or less at different distances from the centre.
Into any one of these holes I put a pin which can be shifted at pleasure. This
pin should be so placed that when the carriage is hauled back & the
machine set for the next cut the line shall bear a little against this pin
so as to start the carriage easy. Then when the pin leaves the line the
line hangs at the diminution of the spiral grooving aforesaid, which
gives the weight a light power upon the carriage when the saw first
begins to enter the bolt which increases as the roller turns forward until
it comes to its full strength on the circumference. I have found from
practice that fourteen pounds are about right for the weight. ~~This~~
This may be increased or decreased according to the power required to
drive the saw. I make the weight by putting small rocks or any heavy ar-
=ticle in a box which can be increased or decreased at pleasure. I set
this roller or pulley in the top of a short post which is framed into any
convenient timber in the mill and so placed that the tail cross bar of
the carriage shall come near to it when the saw has made its run.
This machinery feeds the bolt to the saw when cutting. but water power
or any other may be had if preferred.

I have now described the machine and its parts and
and their operations used in sawing shingles and proceed to describe
those parts used in sawing clapboards. 3D. In preparing the machine
for sawing clapboards, I first remove the jaws ~~and their apparatus, the~~
~~first remove the jaws~~ and all their apparatus the inclined braces and centre
piece, and the setter on the tail stock. Then having cut notches or gudgeon
boxes in the toe bars and heel bars, on the inner ends, I place in an [illegible]
[illegible] upon the right hand side of the foot of each stirrup. The roller on the
foot of the stirrup in the tail stock has a straight smooth barrell. The
roller in the foot of the stirrup in the head stock has a rag wheel, on
the end next to the heel bar, and the other end fluted. The rag wheel
is used to set by. One end of the log ~~rests on the fluted end~~. These
flutes are designed to hold on to the log and make it move regularly with the roller, when the setting apparatus moves the roller by the rag
wheel. The other end of the log rests on the other roller, the roller mo-
-ving with the log at every set. These rollers may be six inches long, &
four in diameter more or less, as necessary. The rag wheel may be the
depth of its notches larger than the roller. 33, To the end of the perpen-
-dicular part of the setter on the head stock, I attach a hand by the same
bolt and nut as before, which reaches on to the rag wheel. No 32 and turns
the roller and sets the log, when the setting motion is given to the
machine. The setter on the tail stock is not used nor the rail in saw-
-ing clap boards. 34, On the back side of the heel bar, on the head
stock stirrup, a strong spring is fastened. A screw in the end of the
spring passes loose through a hole in heel bar and sets hard against the
rag wheel No 32 which holds the roller firm in the place where it
put by the hand, when the setting motion is given to it in every set
of the log, when sawing. 35. On the inside of the head stock and tail
stock I fasten a perpendicular piece of flat iron with rivets two feet
long, and inch and a half by half inch. To the left of these perpendicular
pieces and about five eighths of an inch distant, I fasten another piece
on the head block and tail block of like dimensions, at the lower end
by one pin or rivet so that it may be turned down and up as occasion
may require. These are called the centre guides, and the centre between
these two pieces should come directly over the perpendicular saw. When
the log is put into the machine these swing pieces are turned down to
the left, the log is then rolled in, and then these swing pieces are tur-
-ned up, and then each pair of these centre pieces confines one of the
centre pins in the two ends of the log, the lower ends of these centre
pieces should come down as near as possible to the under side of each clamp
to which it is fastened. Then the centre of the rollers on which the log rests
are about three inches to the left of the centres of the log, which makes the
log bind hard enough upon the rollers, so that it shall not slip. These
centre pins in the ends of the log are about five eighths of an inch diam-
-eter and should be screwed or driven in there or four inches more or less, so as
to stand firm, Between the centre guides the wood may be cut away so as to give a greater length to the centre piece if necessary. When the centre
guides are turned up together they are held together at the top by a slip
of wood or iron. 26. A brace as described in No 19. is applied in the
same manner and made in the same way, and for the same purpose except
its greater length, to accommodate the greater length of the log over that
of the shingle bolt. 27. Before the log is put in place for sawing I dub
out the sap four inches wide more or less, the length of the log, is wide
enough for the horizontal circular saw to play in. 28. On the head
side of the bed work or saw frame, and to the right of the perpendicular saw.
I place a small horizontal circular saw, four inches in diameter, more or
less constructed and applied as follows. I cut a perpendicular gain on
the inside of this frame half an inch deep, and three inches wide more
or less. In this grooving I put a wooden slide and secure it in its place
by two staple bolts, which stand about eight inches apart. This slide is
moved up or down at pleasure and held in its place wherever set by these
bolts which may have any degree of tightness required. Upon this slide, I
place and build the saw shaft as follows. The bottom gudgeon is support-
-ed by a box held in its place by a staple or clasp bolts. The upper gudgeon
which is a little below the saw, is supported and kept in its place in
same way. This upper gudgeon passes up through the box leaving a rim
on its top on to which the saw is fastened by three bolts. The length of
this saw shaft may be three feet more or less of inch square iron. On
the lower end of this shaft is a long pulley about one foot to accom-
-modate the [illegible] of the belt as the saw and shaft are raised and low-
-ered as it is used. This pulley may be of any proper diameter, to give
a proper speed to the saw. This saw shaft may be set perpendicular
or may be set inclining to the right or left as shall be most convenient
in practice. In farther explanation of No 27. I would remark that
when this place comes round to the rollers on which the log lies &
turns. I stop the machine and put in wedges at each end between
six or eight clapboards to steady them. Then I pin on a piece of wood
the thickness of the sap about six inches wide, where I had dubbed
out the sap, so as to cover that place, and about three or four inches on to the butt of the sawed clapboards. The design of this piece is to keep the
log up in its place in coming round while the remaining part of the log
is sawing. 39. This machine may be applied to sawing dimension stuff
either flat or square. And when sawing dimension stuff both setters
and both inclined planes are used. If square stuffs are sawed from
the log the horizontal saw and the perpendicular saw must both cut
the same depth. If flat stuffs be sawed one must cut deeper than
the other, the variation between the width and thickness. The log
when sawed into dimension stuffs rests on the toe bars. When boards
or plank are sawed into dimension stuffs, the horizontal saw is not
used, and may be pushed down out of the way as in all other cases
when not used. In setting for dimension stuff a hand is attached to each
setter. The hands lay perpendicular and applied to each end of the log or
bolt to be sawed. These hands open and shut in the same manner &
by the same kind of apparatus as the jaws do as described in no 34.
These hands have claws or fingers which stick and hold fast when
pushing to set and slip easy when hauling back for the next set
The thickness of the piece sawed, must be regulated by the thickness
of the inclined planes 40. In and by my specifications aforesaid, I do not
mean to limit or restrain my right to my aforesaid improvement to the
very uses above described. but to claim and hold the use and benefit of
them to whatever they may hereafter be applied. And the parts of
my said machine as above described which I claim as my own in-
vention, and to which I claim exclusive right are the following The
Inclined planes No 5, Slide No 6, pins No 7. Bed No 8, Knee No 9. Cyl-
inder No 10. Head and Tail blocks No 14, Stirrups and appendages
No 15. Setters & appendages No 16. Rail No 18, Brace No 19. Hands No 21.
Spring posts No 22. Joint pieces No 23, Jaws and appendages No 24. Centre
piece and inclined braces No 25. Side spring No 26. Rest No 27.
Nippers No 28, Roller No 31. Rollers No 32. Hand No 33. Spring & bar
No 34. Centre guides No 35. Method of setting the horizontal saw
No 38. And herein I would be distinctly understood that I do not claim these several parts enumerated in this article but only the pe-
-culiar manner of combining & applying their principles and operations
as described in my machine aforesaid. Those parts in which I do not
claim exclusive right are described in my specifications aforesaid as show-
-ing the connections and operations they have to and with the parts to
which I claim exclusive right —

In testimony that the above is a true Specification
of my said improvement as above described. I have hereunto set my hand
and seal this twenty eighth day of May in the year of our Lord
One thousand eight hundred and thirty one —

Witnesses
Jonathan Morgan
Chandler R. Lovitt
Zachariah [illegible] Stevens

Jonathan Hobbs Jr.

Ex d. [illegible]

(Patented 18th Augt 1831)

(6146 words)